(12) United States Patent
Tang

(10) Patent No.: US 10,371,992 B2
(45) Date of Patent: Aug. 6, 2019

(54) BLUE PHASE LIQUID CRYSTAL PANEL AND BLUE PHASE LIQUID CRYSTAL DISPLAY DEVICE

(71) Applicant: Wuhan China Star Optoelectronics Technology Co., Ltd., Wuhan (CN)

(72) Inventor: Yuejun Tang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 14/897,346

(22) PCT Filed: Aug. 14, 2015

(86) PCT No.: PCT/CN2015/086960
§ 371 (c)(1),
(2) Date: Sep. 8, 2017

(87) PCT Pub. No.: WO2017/020342
PCT Pub. Date: Feb. 9, 2017

(65) Prior Publication Data
US 2018/0088376 A1      Mar. 29, 2018

(30) Foreign Application Priority Data

Aug. 4, 2015  (CN) .......................... 2015 1 0470319

(51) Int. Cl.
*G02F 1/1343*    (2006.01)
*G02F 1/1337*    (2006.01)
(Continued)

(52) U.S. Cl.
CPC ........ *G02F 1/1343* (2013.01); *C09K 19/0275* (2013.01); *G02F 1/133707* (2013.01);
(Continued)

(58) Field of Classification Search
CPC ................... G02F 1/1343; G02F 1/137; G02F 2001/13793; G02F 2001/134381; G02F 1/133707; C09K 19/0275
See application file for complete search history.

(56) References Cited

U.S. PATENT DOCUMENTS 8,355,109 B2      1/2013  Kubota et al.
10,162,224 B2 *  12/2018  Tang ..................... G02F 1/1343
(Continued)

FOREIGN PATENT DOCUMENTS

CN       101782702 A       7/2010
CN       101943815 A       1/2011
(Continued)

OTHER PUBLICATIONS

Office Action dated Jun. 28, 2017 by the State Intellectual Property Office of the People's Republic of China in corresponding Chinese Patent Application No. 201510470319.5. (6 pages).
(Continued)

*Primary Examiner* — Jessica M Merlin

(57) ABSTRACT

A blue phase liquid crystal panel is disclosed, which includes an upper substrate, a lower substrate, and blue phase liquid crystal that is arranged between the upper substrate and the lower substrate. The upper substrate is provided with a first electrode base layer which has a plurality of first protrusions, and the lower substrate is provided with a second electrode base layer which has a plurality of second protrusions. The first protrusions each extend to a position between two adjacent second protrusions, and the second protrusions each extend to a position between two adjacent first protrusions. The first protrusion is provided with a common electrode, and the second protrusion is provided with a pixel electrode. The driving voltage of blue phase liquid crystal in the panel can be reduced.

12 Claims, 3 Drawing Sheets

(51) Int. Cl.
*C09K 19/02* (2006.01)
*G02F 1/137* (2006.01)

(52) U.S. Cl.
CPC .............. *G02F 1/134309* (2013.01); *G02F 2001/13793* (2013.01); *G02F 2001/134381* (2013.01)

(56) References Cited

U.S. PATENT DOCUMENTS

| | | | |
|---|---|---|---|
| 2010/0195028 A1 | 8/2010 | Kubota et al. | |
| 2011/0122332 A1* | 5/2011 | Kubota | G02F 1/133707 349/44 |
| 2011/0249229 A1* | 10/2011 | Kubota | G02F 1/133707 349/141 |
| 2012/0194774 A1 | 8/2012 | Jung et al. | |
| 2012/0327350 A1* | 12/2012 | Chang | G02F 1/133371 349/139 |
| 2014/0049732 A1 | 2/2014 | Xie et al. | |
| 2015/0309376 A1* | 10/2015 | Hirosawa | G02F 1/133345 349/123 |
| 2016/0291425 A1 | 10/2016 | Ma | |
| 2016/0342045 A1 | 11/2016 | Tang | |

FOREIGN PATENT DOCUMENTS

| | | |
|---|---|---|
| CN | 102087446 A | 6/2011 |
| CN | 102162955 A | 8/2011 |
| CN | 202256974 U | 5/2012 |
| CN | 102621749 A | 8/2012 |
| CN | 102841472 A | 12/2012 |
| CN | 104714344 A | 6/2015 |
| CN | 104765207 A | 7/2015 |
| CN | 104991386 A | 10/2015 |

OTHER PUBLICATIONS

Notification of Transmittal of the International Search Report and the Written Opinion of the International Searching Authority (Forms PCT/ISA/220, PCT/ISA/210, and PCT/ISA/237) dated Apr. 28, 2016, by the State Intellectual Property Office of People's Republic of China Patent Office in corresponding International Application No. PCT/CN2015/086960. (12 pages).

Office Action dated Mar. 15, 2018, by the State Intellectual Property Office of the People's Republic of China in corresponding Chinese Patent Application No. 201510470319.5. (6 pages).

Office Action dated Aug. 10, 2018, by the State Intellectual Property Office of China in corresponding Chinese Patent Application No. 201510470319.5. (4 pages).

* cited by examiner

BLUE PHASE LIQUID CRYSTAL PANEL AND BLUE PHASE LIQUID CRYSTAL DISPLAY DEVICE

CROSS REFERENCE TO RELATED APPLICATION

The present application claims priority of Chinese patent application CN 201510470319.5, entitled "Blue Phase Liquid Crystal Panel and Blue Phase Liquid Crystal Display Device" and filed on Aug. 4, 2015, the entirety of which is incorporated herein by reference.

FIELD OF THE INVENTION

The present disclosure relates to the technical field of liquid crystal display device, and particularly to a blue phase liquid crystal panel and a blue phase liquid crystal display device.

BACKGROUND OF THE INVENTION

At present, blue phase liquid crystal is widely used in liquid crystal display devices due to its excellent performance. When a liquid crystal display panel is applied with a voltage, the blue phase liquid crystal would be "stretched" in vertical direction by a vertical electric field that is formed between pixel electrodes on an array substrate of the liquid crystal display panel and common electrodes on an opposite substrate. A phase of polarized light does not change when the polarized light passes through blue phase liquid crystal that is stretched in vertical direction. That is, a polarization state of the polarized light after passing through the blue phase liquid crystal is the same as a polarization state of the polarized light when the blue phase liquid crystal display panel is not applied with a voltage. In addition, since an absorption axis of an upper polarizing film of the liquid crystal display panel is perpendicular to that of a lower polarizing film of the display panel, light that is emitted by a backlight source cannot pass through the liquid crystal display panel, and thus a bright state of the liquid crystal display panel cannot be obtained. In a word, with respect to the blue phase liquid crystal display panel, the display of each gray-scale cannot be realized only by a vertical electric field.

In order to realize the display of each gray-scale of the blue phase liquid crystal display panel and reduce a driving voltage of blue phase liquid crystal, a horizontal electric field strength of the liquid crystal display panel should be improved. At present, the purpose is generally achieved through optimizing an electrode structure. In traditional In-Plane Switching (IPS) driving method, a penetration depth of a horizontal electric field that is generated by parallel electrodes is limited, and therefore, a relatively high driving voltage is still needed.

With respect to the aforesaid technical problem, a blue phase liquid crystal panel in which the driving voltage can be further reduced is needed.

SUMMARY OF THE INVENTION

With respect to the aforesaid technical problem, the present disclosure provides a blue phase liquid crystal panel and a blue phase liquid crystal display device.

The present disclosure provides a blue phase liquid crystal panel, which comprises an upper substrate and a lower substrate that are arranged facing each other, and blue phase liquid crystal that is arranged between the upper substrate and the lower substrate. The upper substrate, on a surface thereof facing the blue phase liquid crystal, is provided with a first electrode base layer which has a plurality of first protrusions, and the lower substrate, on a surface thereof facing the blue phase liquid crystal, is provided with a second electrode base layer which has a plurality of second protrusions. The first protrusions each extend to a position between two adjacent second protrusions, and the second protrusions each extend to a position between two adjacent first protrusions. The first protrusion is provided with a common electrode, and the second protrusion is provided with a pixel electrode.

According to the present disclosure, the upper substrate and the lower substrate are provided with the first electrode base layer and the second electrode base layer respectively, and electrodes are formed on a corresponding electrode base layer, whereby the display function of the liquid crystal display device can be realized. Through arranging a structure of each electrode base layer, a horizontal electric field strength in In-Plane Switching (IPS) display mode can be improved after the corresponding electrodes are formed, or an oblique electric field strength similar to Vertical Alignment (VA) display mode can be formed, whereby a driving voltage of blue phase liquid crystal can be reduced. Therefore, the technical problem that the driving voltage of blue phase liquid crystal is too large can be solved.

According to some embodiments, the pixel electrode comprises a first pixel electrode and a second pixel electrode. One of the two adjacent second protrusions is provided with the first pixel electrode, and the other one of the two adjacent second protrusions is provided with the second pixel electrode. A horizontal electric field is formed between the first pixel electrode and the second pixel electrode. In this arrangement, on the one hand, an electric field can be formed both between the first pixel electrode and the common electrode and between the second pixel electrode and the common electrode, and on the other hand, a horizontal electric field can be formed between the first pixel electrode and the second pixel electrode, whereby the horizontal electric field strength in the liquid crystal panel can be improved. Therefore, transmissivity of light in blue phase liquid crystal can be improved, and the driving voltage of blue phase liquid crystal can be reduced.

According to some embodiments, a second common electrode is arranged between the pixel electrode and the lower substrate in an insulation manner. With this arrangement, a horizontal electric field can be formed both between the pixel electrode and the common electrode and between the pixel electrode and the second common electrode, so that the electric field formed in the liquid crystal layer can have a larger horizontal component. That is, in the liquid crystal layer, a higher electric field strength can be formed in horizontal direction. Therefore, liquid crystal molecules in the blue phase liquid crystal can have a larger optical anisotropy in horizontal direction, and thus the driving voltage of blue phase liquid crystal can be reduced.

According to some embodiments, the second protrusion is made of a conductive material and is arranged as the pixel electrode. In this arrangement, the second protrusion is the pixel electrode.

According to some embodiments, the first protrusion and the second protrusion both have a triangle-shaped cross section. Through regulating related parameters of the first protrusion and the second protrusion, such as angles of the triangle, and a distance between adjacent first protrusion and second protrusion, a direction of the electric field in the liquid crystal panel can be further regulated so as to form an oblique electric field, whereby the purpose of reducing the driving voltage of blue phase liquid crystal can be achieved.

According to some embodiments, the first protrusion and the second protrusion both have a rectangle-shaped cross section. The first protrusion and the second protrusion with the rectangle-shaped cross section can be manufactured easily. The horizontal electric field strength in the liquid crystal panel can be further regulated through regulating a horizontal distance/vertical distance between the first protrusion and the second protrusion.

According to some embodiments, the common electrodes cover the first electrode base layer completely, and the pixel electrodes cover the second electrode base layer completely.

According to some embodiments, the first electrode base layer comprises a first baseplate, and the first protrusions are arranged spaced from one another on the first baseplate. The second electrode base layer comprises a second baseplate, and the second protrusions are arranged spaced from one another on the second baseplate. With this arrangement, since the first protrusions are arranged spaced from one another on the first baseplate, and the second protrusions are arranged spaced from one another on the second baseplate, the first electrode base layer and the second electrode base layer both have an integrated structure. In this manner, on the one hand, the first electrode base layer and the second electrode base layer can be arranged on a corresponding substrate conveniently, and on the other hand, the first electrode base layer and the second electrode base layer can cooperate with each other better.

According to some embodiments, an area of the first baseplate corresponding to the second protrusion is not provided with the common electrode, and an area of the second baseplate corresponding to the first protrusion is not provided with the pixel electrode. With this arrangement, a vertical electric field strength in the liquid crystal panel can be weakened, while a horizontal electric field strength thereof can be increased. In this manner, liquid crystal molecules in the blue phase liquid crystal can have a larger optical anisotropy in horizontal direction. Therefore, the transmissivity of light in blue phase liquid crystal can be improved, and the driving voltage of blue phase liquid crystal can be reduced.

The present disclosure provides a blue phase liquid crystal display device, which comprises the aforesaid blue phase liquid crystal panel. The driving voltage of the blue phase liquid crystal display device is relatively small. Moreover, since the transmissivity of light in blue phase liquid crystal is relatively high, a better display effect can be achieved.

According to the present disclosure, the upper substrate and the lower substrate are provided with the first electrode base layer and the second electrode base layer respectively, and electrodes are formed on a corresponding electrode base layer, whereby the display function of the liquid crystal display device can be realized. Through arranging a structure of each electrode base layer, a horizontal electric field strength in IPS display mode can be improved after the corresponding electrodes are formed, or an oblique electric field strength similar to VA display mode can be formed, whereby a driving voltage of blue phase liquid crystal can be reduced. Therefore, the technical problem that the driving voltage of blue phase liquid crystal is too large can be solved. In addition, according to the present disclosure, the first protrusions and the second protrusions are arranged with structure cooperating with each other, and the electrodes cannot be destroyed easily when the liquid crystal panel is pressed since there is no interference between the first protrusions and the second protrusions.

BRIEF DESCRIPTION OF THE DRAWINGS

The present disclosure will be illustrated in detail hereinafter with reference to the embodiments and the drawings. In the drawings.

Figure 1:
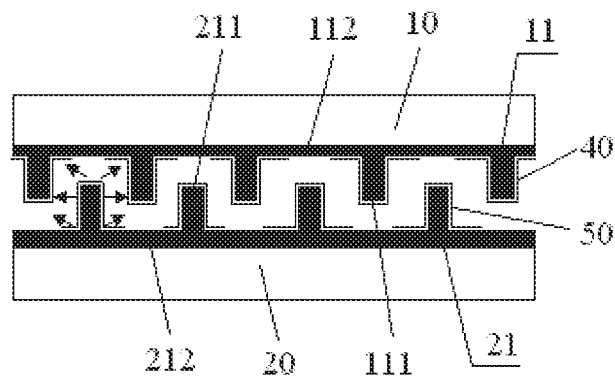
FIG. 1 schematically shows a structure of a blue phase liquid crystal panel according to embodiment 1 of the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

The details described herein are only specific examples used for discussing the implementations of the present disclosure. The most useful and most understandable description on the principle and concept of the present disclosure is provided. The structural details which go beyond the scope of basic understanding of the present disclosure are not provided herein. Therefore, those skilled in the art can clearly understand, based on the description and the accompanying drawings, how to implement the present disclosure in different ways.

FIG. 1 schematically shows a structure of a blue phase liquid crystal panel 100 according to embodiment 1 of the present disclosure. According to the present embodiment, the first protrusion 111 and the second protrusion 211 both have a rectangle-shaped cross section. The blue phase liquid crystal panel 100 comprises an upper substrate 10 and a lower substrate 20 that are arranged facing each other, and blue phase liquid crystal (not shown in FIG. 1) that is arranged between the upper substrate 10 and the lower substrate 20. The upper substrate 10, on a surface thereof facing the blue phase liquid crystal, is provided with a first electrode base layer 11 which has a plurality of first protrusions 111, and the lower substrate 20, on a surface thereof facing the blue phase liquid crystal, is provided with a second electrode base layer 21 which has a plurality of second protrusions 211. The first protrusions 111 each extend to a position between two adjacent second protrusions 211, and the second protrusions 211 each extend to a position between two adjacent first protrusions 111. The first protrusion 111 is provided with a common electrode 40, and the second protrusion 211 is provided with a pixel electrode 50. The first electrode base layer 11 and the second electrode base layer 21 are both made of insulation material.

According to the present disclosure, the upper substrate 10 and the lower substrate 20 are provided with the first electrode base layer 11 and the second electrode base layer 21 respectively, and electrodes are formed on a corresponding electrode base layer, whereby the display function of the liquid crystal display device can be realized. Through arranging the structures of the first protrusions 111 on the first electrode base layer 11 and the second protrusions 211 on the second electrode base layer 21 so as to form a cooperation therebetween, and arranging a corresponding electrode on each of the first protrusions 111 and the second protrusions 211, a horizontal electric field strength in IPS display mode can be improved, whereby a driving voltage of blue phase liquid crystal can be reduced. Therefore, the technical problem that the driving voltage of blue phase liquid crystal is too large can be solved. In addition, since there is no interference between the first protrusions 111 and the second protrusions 211, the electrodes that are arranged on the protrusions cannot be destroyed easily when the liquid crystal panel 100 is pressed.

According to the embodiment as shown in FIG. 1, the first protrusion 111 and the second protrusion 211 with the rectangle-shaped cross section can be manufactured easily. The horizontal electric field strength in the liquid crystal panel can be further regulated through regulating a horizontal distance/vertical distance between the first protrusion 111 and the second protrusion 211.

As shown in FIG. 1, the first electrode base layer 11 preferably comprises a first baseplate 112, and the first protrusions 111 that are arranged spaced from one another on the first baseplate 112. The second electrode base layer 21 comprises a second baseplate 212, and the second protrusions 211 that are arranged spaced from one another on the second baseplate 212. With this arrangement, since the first protrusions 111 are arranged spaced from one another on the first baseplate 112, and the second protrusions 211 are arranged spaced from one another on the second baseplate 212, the first electrode base layer 11 and the second electrode base layer 21 both have an integrated structure. In this manner, on the one hand, the first electrode base layer 11 and the second electrode base layer 21 can be arranged on a corresponding glass substrate conveniently, and on the other hand, the first electrode base layer 11 and the second electrode base layer 21 can cooperate with each other better.

According to the present disclosure, the common electrodes 40 cover the first electrode base layer 11 completely, and the pixel electrodes 50 cover the second electrode base layer 21 completely. Preferably, according to the embodiment as shown in FIG. 1, an area of the first baseplate 112 corresponding to the second protrusion 211 is not provided with the common electrode 40, and an area of the second baseplate 212 corresponding to the first protrusion 111 is not provided with the pixel electrode 50. With this arrangement, a vertical electric field strength in the liquid crystal panel 100 can be weakened, while a horizontal electric field strength thereof can be increased. Therefore, the driving voltage of blue phase liquid crystal can be reduced. Meanwhile, since the horizontal electric field strength in the liquid crystal panel is increased, liquid crystal molecules in the blue phase liquid crystal can have a larger optical anisotropy in horizontal direction. In this manner, the transmissivity of light in blue phase liquid crystal can be improved, and a better display effect of the liquid crystal display device 100 can be achieved.

Figure 2:
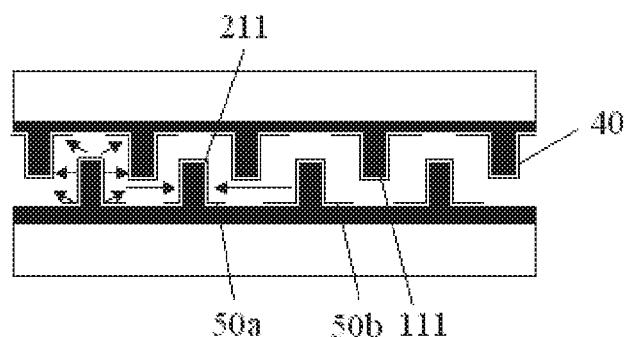
FIG. 2 schematically shows a structure of a blue phase liquid crystal panel according to embodiment 2 of the present disclosure.

Preferably, according to the embodiment as shown in FIG. 2, the difference thereof from the embodiment as shown in FIG. 1 lies in that: the pixel electrode comprises a first pixel electrode 50a and a second pixel electrode 50b; one of the two adjacent second protrusions 211 is provided with the first pixel electrode 50a, and the other one of the two adjacent second protrusions is provided with the second pixel electrode 50b; and a horizontal electric field is formed between the first pixel electrode 50a and the second pixel electrode 50b. With this arrangement, the first pixel electrode 50a and the second pixel electrode 50b are controlled by a corresponding Thin Film Transistor (TFT) respectively, and are provided with a symmetrical control signal as the signal provided to the corresponding common electrode 40 but with an opposite direction. In this manner, a horizontal electric field can be formed between the first pixel electrode 50a and the common electrode 40, and between the second pixel electrode 50b and the common electrode 40. Besides, since an electric potential difference exists between the first pixel electrode 50a and the second pixel electrode 50b, a horizontal electric field can also be formed therebetween. That is, the horizontal electric field strength in the liquid crystal panel 100 can be further improved. Therefore, the transmissivity of light in blue phase liquid crystal can be improved, and the driving voltage of blue phase liquid crystal can be reduced.

Figure 3:
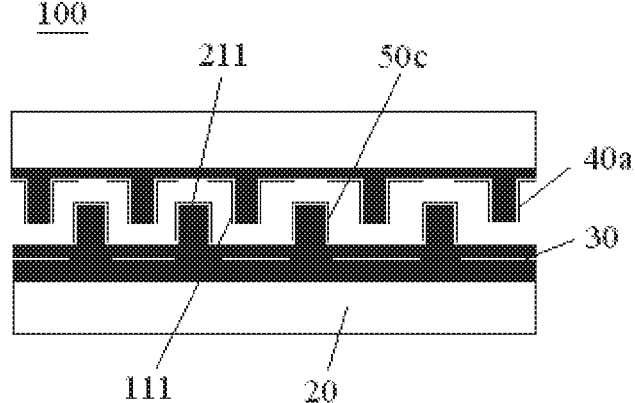
FIG. 3 schematically shows a structure of a blue phase liquid crystal panel according to embodiment 3 of the present disclosure.

According to the embodiment as shown in FIG. 3, a second common electrode 30 is arranged between the pixel electrode 50c and the lower substrate 20 in an insulation manner. According to the present embodiment, an area of the first protrusion 111 corresponding to the second common electrode 30 is not provided with a common electrode 40a. The common electrode 40a and the second common electrode 30 provide a same common signal to the pixel electrode 50c. Under this circumstances, a vertical electric field cannot be formed between the common electrode 40a and the second common electrode 30, while a horizontal electric field can be formed both between the pixel electrode 50c and the common electrode 40a, and between the pixel electrode 50c and the second common electrode 30. Due to the second common electrode 30 provided therein, the electric field formed in the liquid crystal layer can have a larger horizontal component. That is, in the liquid crystal layer, a higher electric field strength can be formed in horizontal direction. Therefore, liquid crystal molecules in the blue phase liquid crystal can have a larger optical anisotropy in horizontal direction, and thus the driving voltage of blue phase liquid crystal can be reduced.

Figure 4:
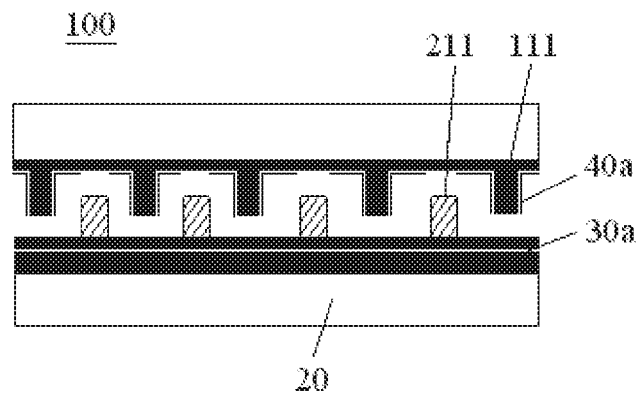
FIG. 4 schematically shows a structure of a blue phase liquid crystal panel according to embodiment 4 of the present disclosure.

According to the embodiment as shown in FIG. 4, the second protrusion 211 is made of a conductive material and is arranged as the pixel electrode 50c as shown in FIG. 3. According to the present embodiment, the second protrusion 211 serves as the pixel electrode and participates in the driving of blue phase liquid crystal directly. The common electrode 30a can be arranged between the second protrusion 211 and the lower substrate 20 in an insulation manner and the common electrode 30a covers the lower substrate 20 completely. According to the present embodiment, the second protrusion is the pixel electrode.

Figure 5:
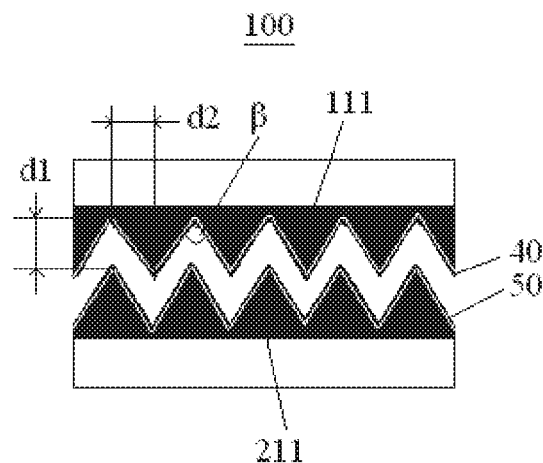
FIG. 5 schematically shows a structure of a blue phase liquid crystal panel according to embodiment 5 of the present disclosure.
Figure 6:
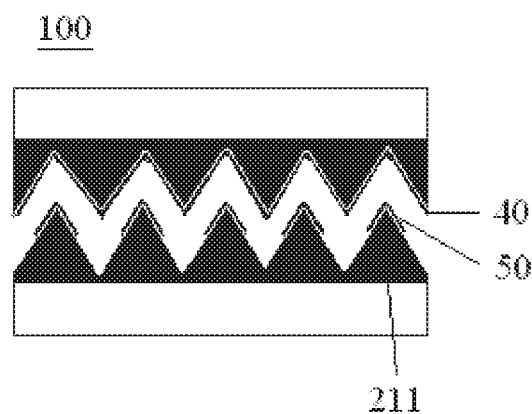
FIG. 6 schematically shows a structure of a blue phase liquid crystal panel according to embodiment 6 of the present disclosure.

According to another embodiment of the present disclosure as shown in FIG. 5, the first protrusion 111 and the second protrusion 211 both have a triangle-shaped cross section. The electric field strength in the blue phase liquid crystal panel 100 can be regulated through regulating related parameters of the first protrusion 111 and the second protrusion 211, such as angles of the triangle, and a distance between opposite first protrusion 111 and second protrusion 211 (i.e., d1, d2, and angle β as shown in FIG. 5). According to the present embodiment, an oblique electric field can be formed between the first protrusion 111 and the second protrusion 211, whereby the technical defect that the blue phase liquid crystal cannot be driven by a vertical electric field can be solved. In this manner, the horizontal electric field strength can be improved, and the driving voltage of blue phase liquid crystal can be reduced. According to the embodiment as shown in FIG. 6, the difference thereof from the embodiment as shown in FIG. 5 lies in that: the pixel electrode 50 can be arranged on part of the second protrusion 211.

Figure 7:
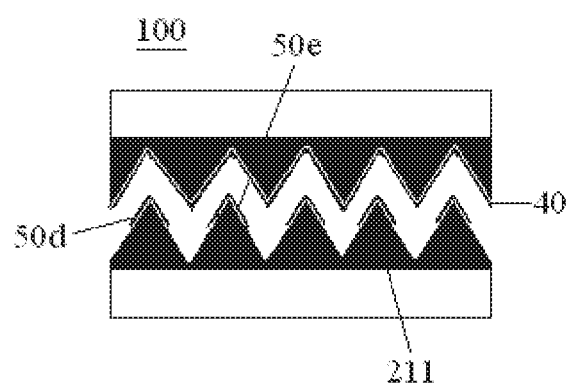
FIG. 7 schematically shows a structure of a blue phase liquid crystal panel according to embodiment 7 of the present disclosure.

According to the embodiment as shown in FIG. 7, the first pixel electrodes 50d and the second pixel electrodes 50e can be arranged on the second protrusions 211 in an alternate manner. With this arrangement, the first pixel electrode 50d and the second pixel electrode 50e are controlled by a corresponding Thin Film Transistor (TFT) respectively, and are provided with a symmetrical control signal as the signal provided to the corresponding common electrode 40 but with an opposite direction. In this manner, an oblique electric field can be formed between the first pixel electrode 50d and the common electrode 40, and between the second pixel electrode 50e and the common electrode 40. Besides, since an electric potential difference exists between the first pixel electrode 50d and the second pixel electrode 50e, an oblique electric field can also be formed therebetween. In this manner, liquid crystal molecules in the blue phase liquid crystal can have a larger optical anisotropy. Therefore, the transmissivity of light in blue phase liquid crystal can be improved, and the driving voltage of blue phase liquid crystal can be reduced.

It can be understood that, the shape and arrangement mode of the first protrusion and the second protrusion are not necessarily triangle or rectangle as described herein. Instead, the first protrusion and the second protrusion can be designed with other shapes, as long as the driving voltage of the liquid crystal panel can be reduced.

The present disclosure provides a blue phase liquid crystal display device, which comprises the aforesaid blue phase liquid crystal panel. The driving voltage of the blue phase liquid crystal display device is relatively small, and a better display effect can be realized. The working principle of the blue phase liquid crystal display device is the same as that in the prior art, and the details of which are no longer repeated here.

It should be noted that, the above embodiments are described only for better understanding, rather than restricting the present disclosure. Those skilled in the art can make amendments to the present disclosure within the scope as defined in the claims and without departing from the spirit and scope of the present disclosure. The present disclosure is described according to specific methods, materials, and implementations, but the present disclosure is not restricted by the details disclosed herein. On the contrary, the present disclosure is applicable for the equivalent structures, methods, and applications with the same functions as those defined in the claims.

The invention claimed is:

1. A blue phase liquid crystal panel, comprising an upper substrate and a lower substrate that are arranged facing each other, and blue phase liquid crystal that is arranged between the upper substrate and the lower substrate, wherein the upper substrate, on a surface thereof facing the blue phase liquid crystal, is provided with a first electrode base layer which has a plurality of first protrusions, and the lower substrate, on a surface thereof facing the blue phase liquid crystal, is provided with a second electrode base layer which has a plurality of second protrusions;

wherein the first protrusions each extend to a position between two adjacent second protrusions, and the second protrusions each extend to a position between two adjacent first protrusions;

wherein the first protrusions are provided with a common electrode, and the second protrusions are provided with a pixel electrode;

wherein the pixel electrode comprises a first pixel electrode and a second pixel electrode;

wherein one of the two adjacent second protrusions is provided with the first pixel electrode, and the other one of the two adjacent second protrusions is provided with the second pixel electrode;

wherein a horizontal electric field is formed between the first pixel electrode and the second pixel electrode; and wherein a second common electrode is arranged between the pixel electrode and the lower substrate in an insulation manner, and a top surface area of the first protrusion facing the second common electrode is not provided with a common electrode.

2. The blue phase liquid crystal panel according to claim 1, wherein the first protrusion and the second protrusion both have a triangle-shaped cross section.

3. The blue phase liquid crystal panel according to claim 1, wherein the first protrusion and the second protrusion both have a rectangle-shaped cross section.

4. The blue phase liquid crystal panel according to claim 1, wherein the common electrodes cover the first electrode base layer completely, and the pixel electrodes cover the second electrode base layer completely.

5. The blue phase liquid crystal panel according to claim 1, wherein the first electrode base layer comprises a first baseplate, and the first protrusions are arranged spaced from one another on the first baseplate; and wherein the second electrode base layer comprises a second baseplate, and the second protrusions are arranged spaced from one another on the second baseplate.

6. The blue phase liquid crystal panel according to claim 5, wherein an area of the first baseplate corresponding to the second protrusion is not provided with the common electrode; and wherein an area of the second baseplate corresponding to the first protrusion is not provided with the pixel electrode.

7. A blue phase liquid crystal display device, comprising a blue phase liquid crystal panel, which comprises:

an upper substrate and a lower substrate that are arranged facing each other, and blue phase liquid crystal that is arranged between the upper substrate and the lower substrate, wherein the upper substrate, on a surface thereof facing the blue phase liquid crystal, is provided with a first electrode base layer which has a plurality of first protrusions, and the lower substrate, on a surface thereof facing the blue phase liquid crystal, is provided with a second electrode base layer which has a plurality of second protrusions;

wherein the first protrusions each extend to a position between two adjacent second protrusions, and the second protrusions each extend to a position between two adjacent first protrusions;

wherein the first protrusions are provided with a common electrode, and the second protrusions are provided with a pixel electrode;

wherein the pixel electrode comprises a first pixel electrode and a second pixel electrode;

wherein one of the two adjacent second protrusions is provided with the first pixel electrode, and the other one of the two adjacent second protrusions is provided with the second pixel electrode;

wherein a horizontal electric field is formed between the first pixel electrode and the second pixel electrode; and wherein a second common electrode is arranged between the pixel electrode and the lower substrate in an insulation manner, and a top surface area of the first protrusion facing the second common electrode is not provided with a common electrode.

8. The blue phase liquid crystal display device according to claim 7, wherein the first protrusion and the second protrusion both have a triangle-shaped cross section.

9. The blue phase liquid crystal display device according to claim 7, wherein the first protrusion and the second protrusion both have a rectangle-shaped cross section.

10. The blue phase liquid crystal display device according to claim 7, wherein the common electrodes cover the first electrode base layer completely, and the pixel electrodes cover the second electrode base layer completely.

11. The blue phase liquid crystal display device according to claim 7, wherein the first electrode base layer comprises a first baseplate, and the first protrusions are arranged spaced from one another on the first baseplate; and wherein the second electrode base layer comprises a second baseplate, and the second protrusions are arranged spaced from one another on the second baseplate.

12. The blue phase liquid crystal display device according to claim 11, wherein an area of the first baseplate corresponding to the second protrusion is not provided with the common electrode; and wherein an area of the second baseplate corresponding to the first protrusion is not provided with the pixel electrode.

* * * * *